Patented Mar. 20, 1928.

1,662,958

UNITED STATES PATENT OFFICE.

JAMES M. CRANZ, OF BUFFALO, NEW YORK, ASSIGNOR TO THE RUBBER SERVICE LABORATORIES COMPANY, OF AKRON, OHIO, A CORPORATION OF OHIO.

COMPOSITION FOR USE IN FORMING RUBBER AND THE LIKE.

No Drawing. Application filed September 28, 1926, Serial No. 138,336. Renewed August 5, 1927.

This invention relates to compositions for use in connection with the molding or forming of rubber or other plastic materials, particularly during the vulcanization of rubber or during the molding or forming of other materials while the molds or forms are heated, the composition being used to form a coating or film on the mold or forming device to prevent the adhesion thereto of the material being formed.

The objects of this invention are to provide an improved composition of this kind which prevents rubber and other materials from adhering to the mold, press plate or other forming device, and gives the molded articles a more finished and attractive appearance; also to improve compositions of this kind in other respects hereinafter specified.

It is well known that when rubber, phenol condensation products, and similar materials are vulcanized or molded under heat, there is decided tendency of these materials to adhere to the molds and consequently soap has frequently been used on the surface of the mold adjacent to the rubber to prevent the rubber from adhering to the mold. This, however, has been found to be unsatisfactory for the reason that the soap becomes decomposed by the heat of the molds and forms deposits on the mold, which necessitates very frequent cleaning of the molds. Hyposulfite of soda in solution has also been used for this purpose, but has not been found to be entirely satisfactory, and this material also leaves the surface of the rubber in a rough condition and thus interferes with the marketing of the goods.

In accordance with my invention I employ an aqueous solution of a hyposulfite of an alkali metal, hyposulfite of soda being preferably used, and a sugar or similar material, a small quantity of glycerin being added to the solution. The term "sugar" is herein used to indicate various materials in the glucose or saccharose groups, molasses, and the like. The proportions of these various ingredients may differ considerably, and larger or smaller amounts of water may be used in the solution, depending to a large extent upon the nature of the work to be done, upon the composition of the rubber or other material and upon the particular mold.

I preferably make this solution in concentrated form to reduce the expense of handling and shipping the same, which concentrated solution may be diluted by the user as required. For example, a concentrated solution may be made approximately in the following proportions. In 10 gallons of water are dissolved 36 pounds of hyposulfite of soda and 10 pounds of cane sugar, or an equivalent amount of syrup or molasses, and 1 pint of glycerin is added after the hyposulfite of soda and sugar have been thoroughly dissolved in the water. This concentrated solution may be diluted for actual use on the molds or press plates with 12 to 20 parts of water for one part of the concentrated solution.

In actual use the diluted solution is painted or wiped on the surface of the mold which contacts with the rubber or other material to be vulcanized, and since these molds are hot, the water from the solution will readily evaporate, leaving a film or deposit on the surface of the mold, which film or deposit contains hyposulfite of soda, sugar and glycerin, and this film has been found to adhere to the mold with sufficient tenacity so that the pressing of the material to be vulcanized or molded into the mold does not rub the coating or film from the mold and thus leave portions of the mold unprotected by the coating. The hyposulfite of soda is mainly relied upon to prevent the rubber or other material from adhering to the mold, although the sugar also has a tendency to prevent this adhesion. The sugar and glycerin act to improve the appearance of the rubber, the sugar imparting to the material a gloss or sheen and the glycerin makes the material feel soft and smooth. Furthermore these three materials coact together to produce a comparatively tough coating or film on the mold or plate which resists rubbing off when the rubber or other material is pressed into the mold.

When it is desired to use this composition in connection with light colored material, particularly white rubber or other material, it is desirable to add to the composition a small amount of blue dye. Any suitable water soluble dye may be used for this purpose and the dye eliminates the yellowness of appearance which white rubber frequently has. While the dye has no action in freeing the rubber or other material from the mold, yet it is very desirable to incorporate the dye in this composition since in this manner the dye penetrates to a certain extent into the surface of the rubber during the vulcanizing operation so that a more permanent whiteness is imparted to the rubber. Dyes for producing other colors on the surface of the articles may be provided, if desired.

In some instances rubber and similar materials are cured while confined by cloths, and my composition can be used advantageously in such instances by dipping the cloths in the solution. The action of the composition on the cloth is the same as when used on molds or other metal surfaces which contact with a material to be molded or shaped.

I have found by actual experience with compositions that molds, press plates, or the like, when coated with this composition before the material is placed into the mold, require cleaning of the mold or press plate surfaces at much more infrequent intervals than when soap or other materials heretofore employed for this surface are used, so that the composition effects the saving of time in the cleaning of the molds, as well as increasing the efficiency of the molds or presses and improving the surfaces of molded or formed articles.

I claim as my invention:—

1. A composition for use on heated surfaces used for shaping rubber and other plastic materials, consisting of a hyposulfite of an alkali metal, and a sugar.

2. A composition for use on heated surfaces used for shaping rubber and similar materials, consisting of a hyposulfite of an alkali metal, a sugar, and glycerin.

3. A composition for coating heated surfaces of molds, press plates and the like, consisting of dissolving approximately 36 pounds of hyposulfite of soda and 10 pounds of a sugar, and 1 pint of glycerin in 120 to 200 gallons of water.

4. The hereindescribed composition for coating molds, press plates and the like, consisting of an aqueous solution of hyposulfite of an alkali metal, a sugar, glycerin, and a dye.

5. The hereindescribed composition for coating molds, press plates and the like for use in forming white articles, consisting of an aqueous solution of hyposulfite of an alkali metal, a sugar, glycerin, and a blue dye.

JAMES M. CRANZ.